March 19, 1940.  R. F. PEO ET AL  2,194,053
HYDRAULIC SHOCK ABSORBER
Filed Nov. 14, 1938
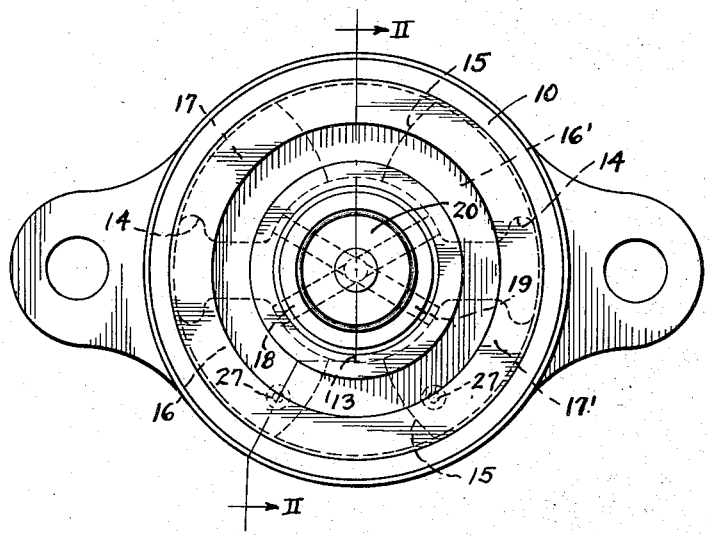
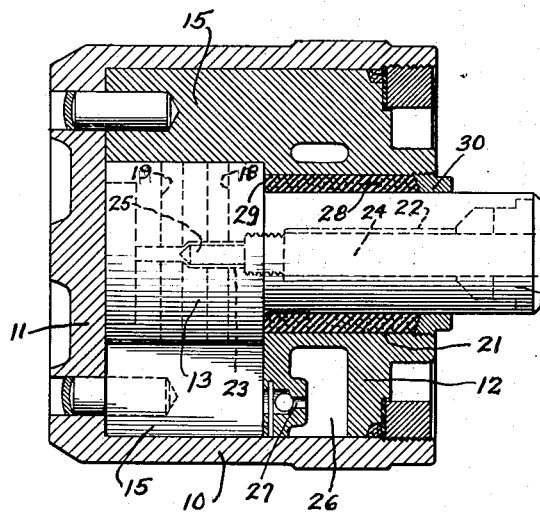
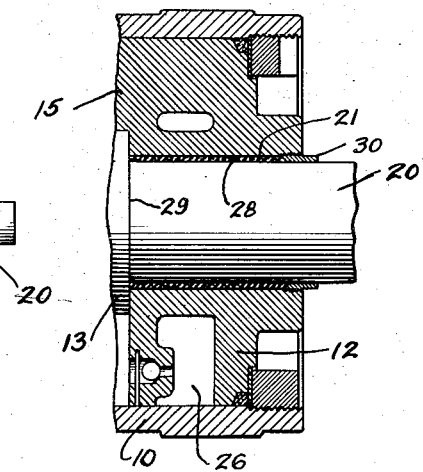
Inventors
Ralph F. Peo.
Gervase M. Magrum.

Patented Mar. 19, 1940

2,194,053

UNITED STATES PATENT OFFICE 2,194,053

HYDRAULIC SHOCK ABSORBER

Ralph F. Peo and Gervase M. Magrum, Buffalo, N. Y., assignors to Houde Engineering Corporation, Buffalo, N. Y., a corporation of New York Application November 14, 1938, Serial No. 240,263

2 Claims. (Cl. 188—89)

This invention relates to hydraulic shock absorbers of the rotary type and particularly to improved bearing and sealing arrangement for the piston element shaft.

Heretofore, in shock absorbers of the type referred to, the shaft extending from the piston hub in the working chamber was journalled directly by the outer wall of the working chamber with sealing packing surrounding the shaft at the outer end of the wall. With such metallic bearing engagement of the shaft, fluid was forced out of the working chambers to leak along the shaft, and provision was made, usually in the form of an intercepting channel in the bearing wall, to receive this leakage fluid in advance of the packing and return it to the fluid reservoir, such leakage detracting from the most efficient operation of the shock absorber.

An important object of our invention is to prevent such leakage and we preferably accomplish this by providing the wall through which the shaft extends with a bushing of resilient material such as rubber or material having the characteristics of rubber, and such rubber or material may have fibrous material embodied therein, or some lubricating material such as graphite, mica or paraffine.

A further object is to provide an arrangement in which the bushing is forced into intimate contact with both the shaft and the supporting wall bore and against the shoulder between the shaft and the piston hub, and with the bushing of sufficient thickness so that during oscillation of the piston structure under normal operation of the shock absorber there will be no movement of the bushing faces relative to the shaft and supporting wall, but the oscillation movement of the piston will be followed by the circumferential distortion or interparticle movement of the bushing material, thus eliminating the usual abrasion or wear and lost motion, while at the same time maintaining a complete seal against escape of fluid along the shaft from the working chamber.

The bushing may be made comparatively thin, in which case its friction will hold it to the supporting wall and its inner face will act as a bearing for the shaft, and the graphite or self lubricating qualities of fibrous material embodied in the rubber will afford the necessary bearing lubrication, while the bushing will still act as an efficient seal against leakage from the working chamber out along the shaft. Such lubricating material will also serve as a lubricant where the bushing is comparatively thick and where abnormal oscillations of the piston element will cause turning of the shaft beyond the stretch limit of the rubber.

We have shown our invention embodied in the structure disclosed on the accompanying drawing, in which drawing:

Figure 1 is an end view of a hydraulic shock absorber;

Figure 2 is a section on plane II—II of Figure 1; and

Figure 3 is a fragmentary sectional view showing a modified arrangement involving a comparatively thin bushing.

Briefly describing the shock absorber to which our invention is applied, the cylindrical wall 10 and the base 11 of the cup-shaped housing, and the outer wall 12 within the housing, define the cylindrical space for the piston structure which comprises a cylindrical hub 13 from which the vanes 14 extend. The outer wall 12 has the extensions 15 forming partition walls which with the piston structure divide the vertical working space into working chambers 16, 16' and 17, 17'.

The chambers 16, 16' are connected by a passageway 18 through the piston hub, and the chambers 17, 17' are connected by the passage 19.

The piston structure shaft 20 extends outwardly through the bore 21 of the outer wall 12, and the shaft has the bore 22 leading to the valve chamber 23 interposed between the passageways 18 and 19, a needle valve 24 extending from the exterior through the shaft bore and into the valve chamber, with its end 25 interposed between the passageways so as to control the resistance to the flow of displaced fluid as the piston structure oscillates.

The outer wall 12 is hollowed to provide reservoir space 26 for hydraulic fluid and this space is connected by check valve controlled passageways 27 with the lower working chambers 16 and 17'.

In accordance with our invention we provide for the piston shaft 20 a bearing bushing of rubber or of material having the characteristics of rubber. Referring to Figure 2, the bushing 28 is comparatively thick and is inserted in the bore 21 of the wall 12 to extend inwardly into engagement with the annular shoulder 29 between the shaft and the piston hub 13. A gland ring 30 has threaded engagement in the outer end of the bore 21 for forcing the bushing into intimate contact with both the shaft and the face of the bore 21 and against the shoulder 29 of the piston hub so that the bushing will form an effective seal for preventing leakage from the working chambers outwardly along the shaft or the bore 21. Intercepting channels heretofore provided in the piston shaft supporting wall for intercepting and returning leakage fluid to the reservoir, can thus be eliminated. Leakage being effectively stopped by the bushing, the working chambers of the shock absorber are not robbed of some of the effective fluid, any leakage being then merely from one working chamber to another. Where the bushing is comparatively thick, as shown in Figure 2, there will be no slippage between the bushing and the faces of the shaft and the bore 21 during oscillation of the piston structure under normal shock absorbing conditions, the oscillation of the shaft being taken up entirely by the circumferential distortion or interparticle movement of the bushing material, and abrasion and wear of the shaft and bore face will be prevented.

To strengthen and toughen the bushing material it may be impregnated with fibrous material such as cotton, mica, asbestos, hemp, or material having lubricating characteristics such as graphite. The bushing will then be tough enough to take the place of a metal bushing but will possess the necessary yielding and resilient qualities. Under abnormal shock absorbing conditions and resulting abnormal oscillation of the piston structure, the shaft may slip relative to the bushing but, under such conditions, the impregnated material having lubricating qualities will afford adequate lubrication to prevent wear.

In some installations it may be desirable to have the bushing comparatively thin, as shown on Figure 3. In such arrangement the bushing will be held to the face of the bore 21 in the bearing wall 12 and the piston shaft will oscillate relative to the bushing but the impregnated material will afford the necessary lubrication. The thin bushing, like the thicker bushing, will effect a seal against the escape of hydraulic fluid from the working chambers out along the piston shaft.

We thus provide for the piston shaft of a hydraulic shock absorber a supporting bushing which is substantially frictionless and which forms an effective seal against escape of hydraulic fluid from the shock absorber working chambers. By properly dimensioning the thickness of the bushing relative to the piston oscillation amplitude, the interparticle movement of the bushing will follow the piston oscillation as far as the elastic or stretch limit of the bushing material will permit. Beyond such limit, the impregnated self-lubricating material in the bushing will afford ample lubrication. Abrasion and wear are thus reduced to a minimum.

We have shown and described practical embodiments of our invention, but we do not desire to be limited to the exact structure and arrangement shown and described, as changes and modifications may be made without departing from the scope of the invention.

We claim as follows:

1. In a hydraulic shock absorber, the combination of a cylinder, a piston structure oscillatable in said cylinder and having a shaft extending therefrom, an end wall for said cylinder having a comparatively long bore therethrough through which the shaft extends, a bushing in said bore of material having the characteristics of resilient rubber, and means extending a short distance into the end of said bore and adjustable for sufficiently compressing the bushing material intimately against said shaft and the inner face of the bore to enable said bushing to bear substantially the entire service load on said shaft.

2. In a hydraulic shock absorber, the combination of a cylinder, a piston structure oscillatable in said cylinder and having a shaft extending therefrom, an end wall for said cylinder having a comparatively long bore therethrough through which the shaft extends, a bushing in said bore of material having the characteristics of resilient rubber, and means extending a short distance into this end of said bore and adjustable for sufficiently compressing the bushing material intimately against said shaft and the inner face of the bore to enable said bushing to bear substantially the entire service load on said shaft, said bushing being of a thickness for interparticle movement thereof to follow the oscillation movement of the piston shaft without slippage relative to the shaft or the bore face.

RALPH F. PEO.
GERVASE M. MAGRUM.